A. KADOW.
TRANSMISSION APPARATUS.
APPLICATION FILED OCT. 17, 1912.
1,142,437.
Patented June 8, 1915.
12 SHEETS—SHEET 12.
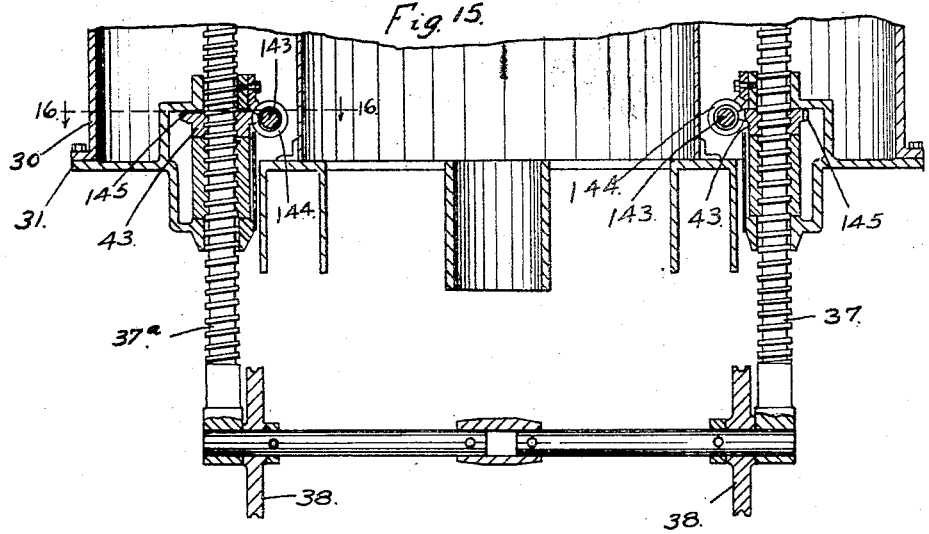
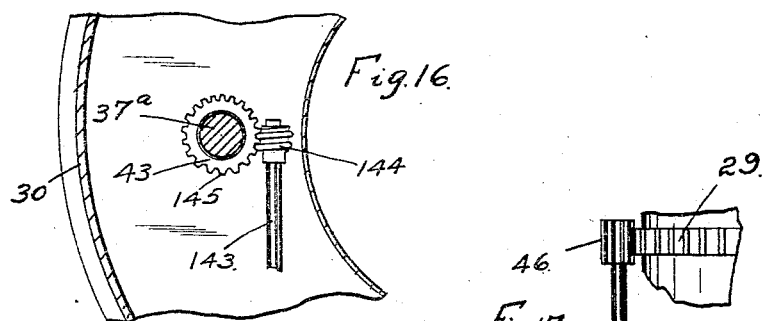
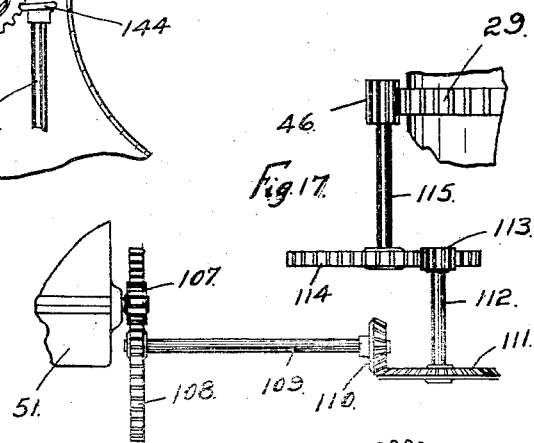
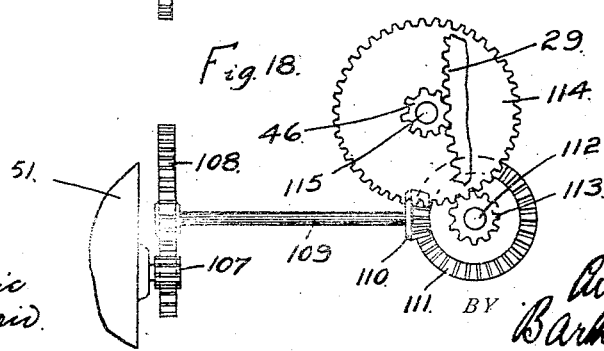
WITNESSES:
H. M. Gillespie
John Lagorio
INVENTOR.
August Kadow
BY Barkett & Numan
ATTORNEYS

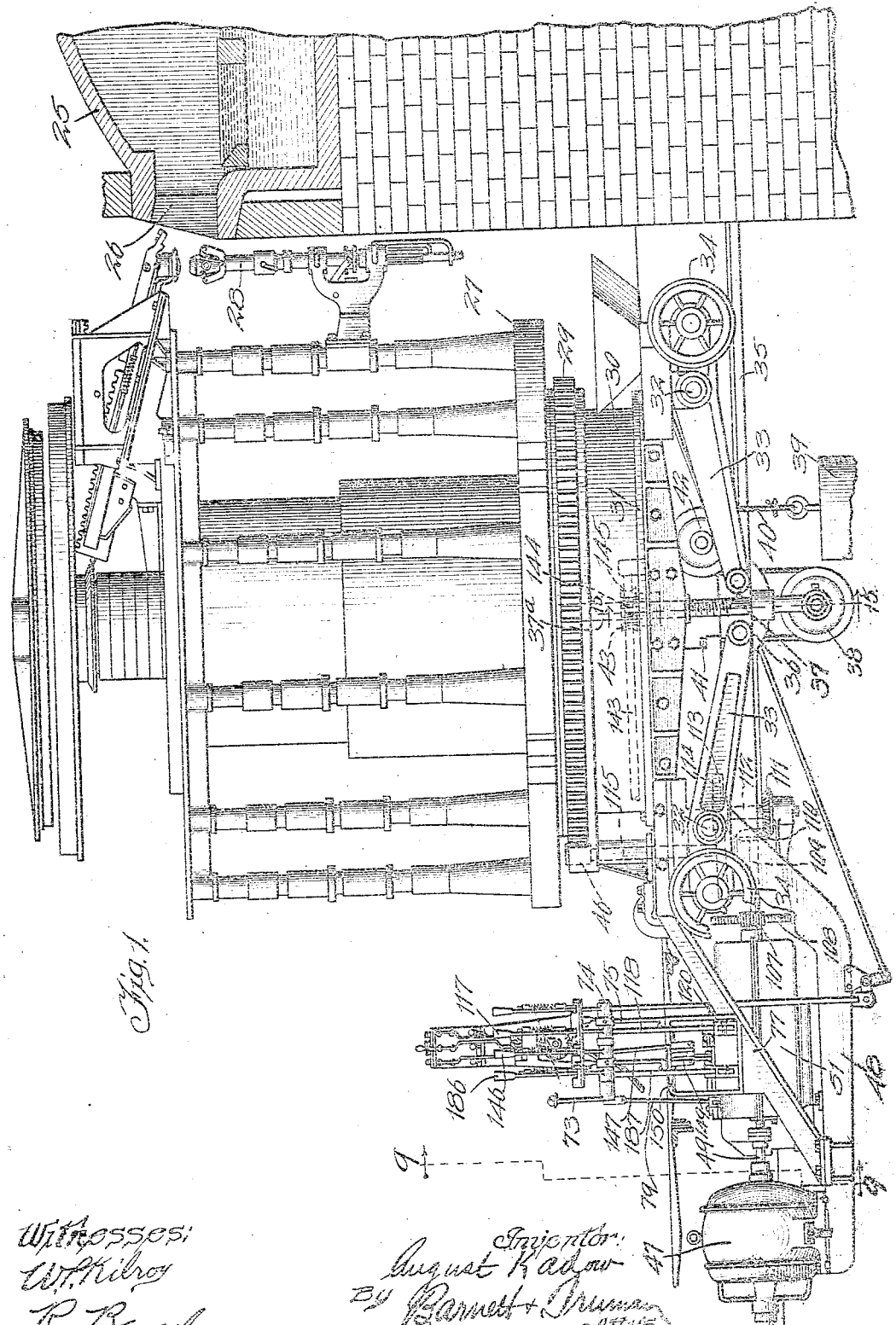

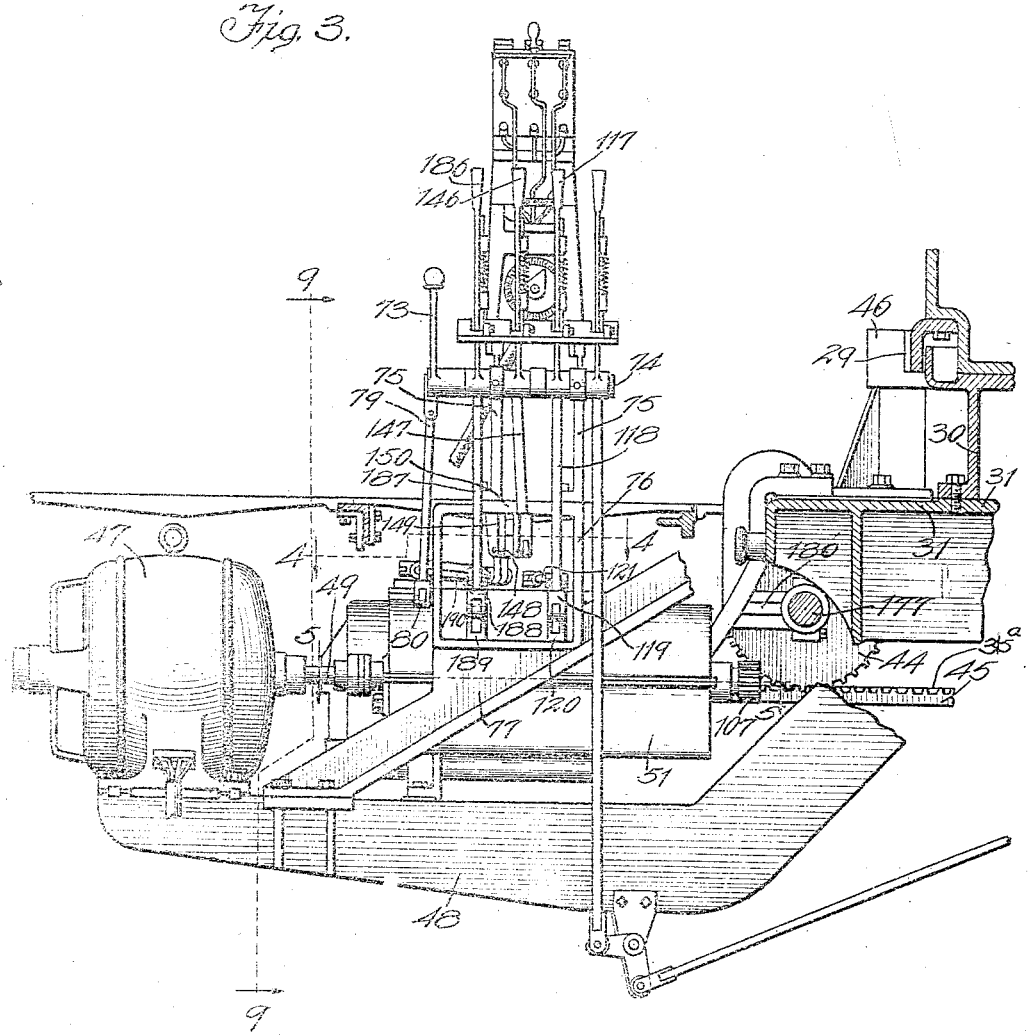

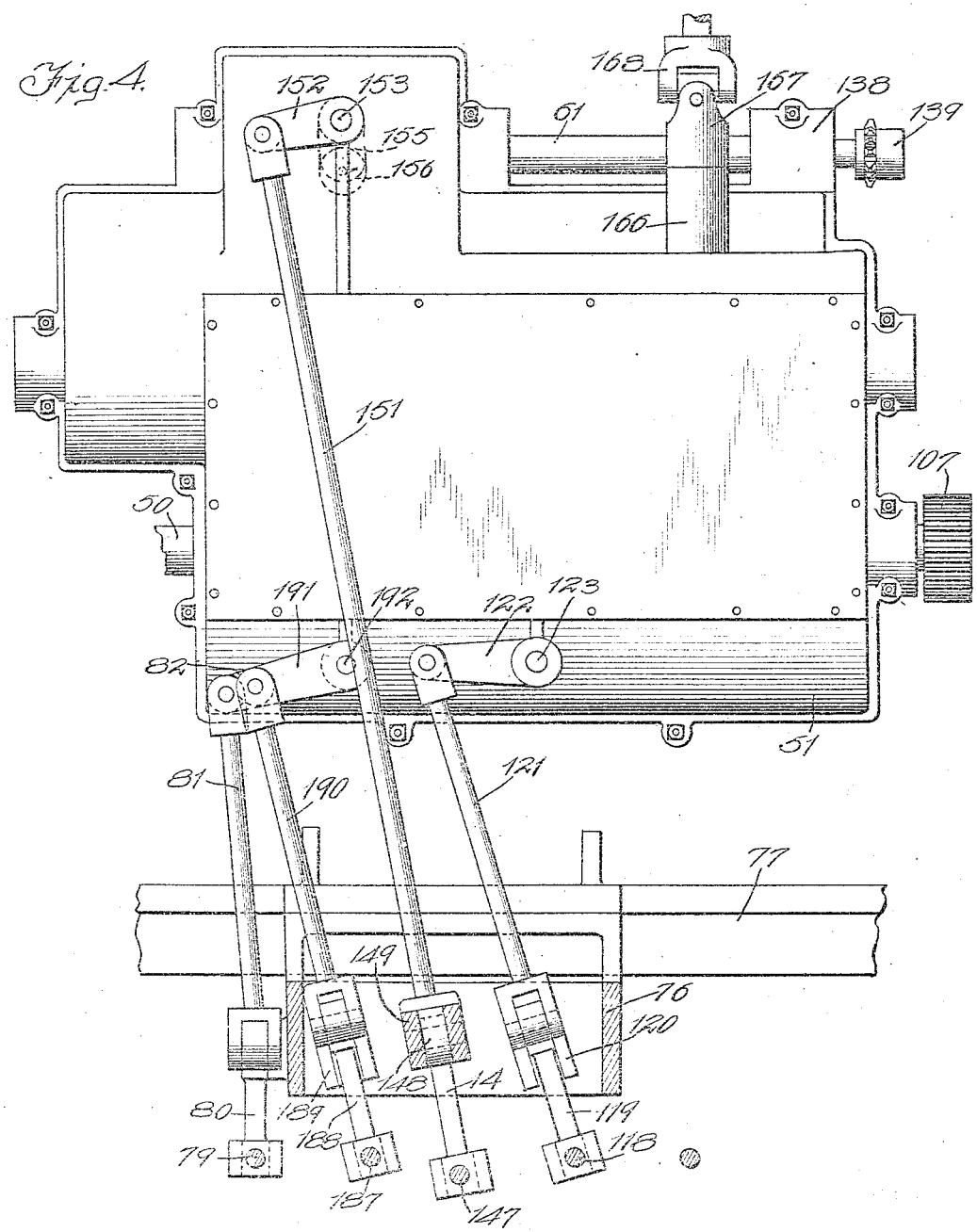

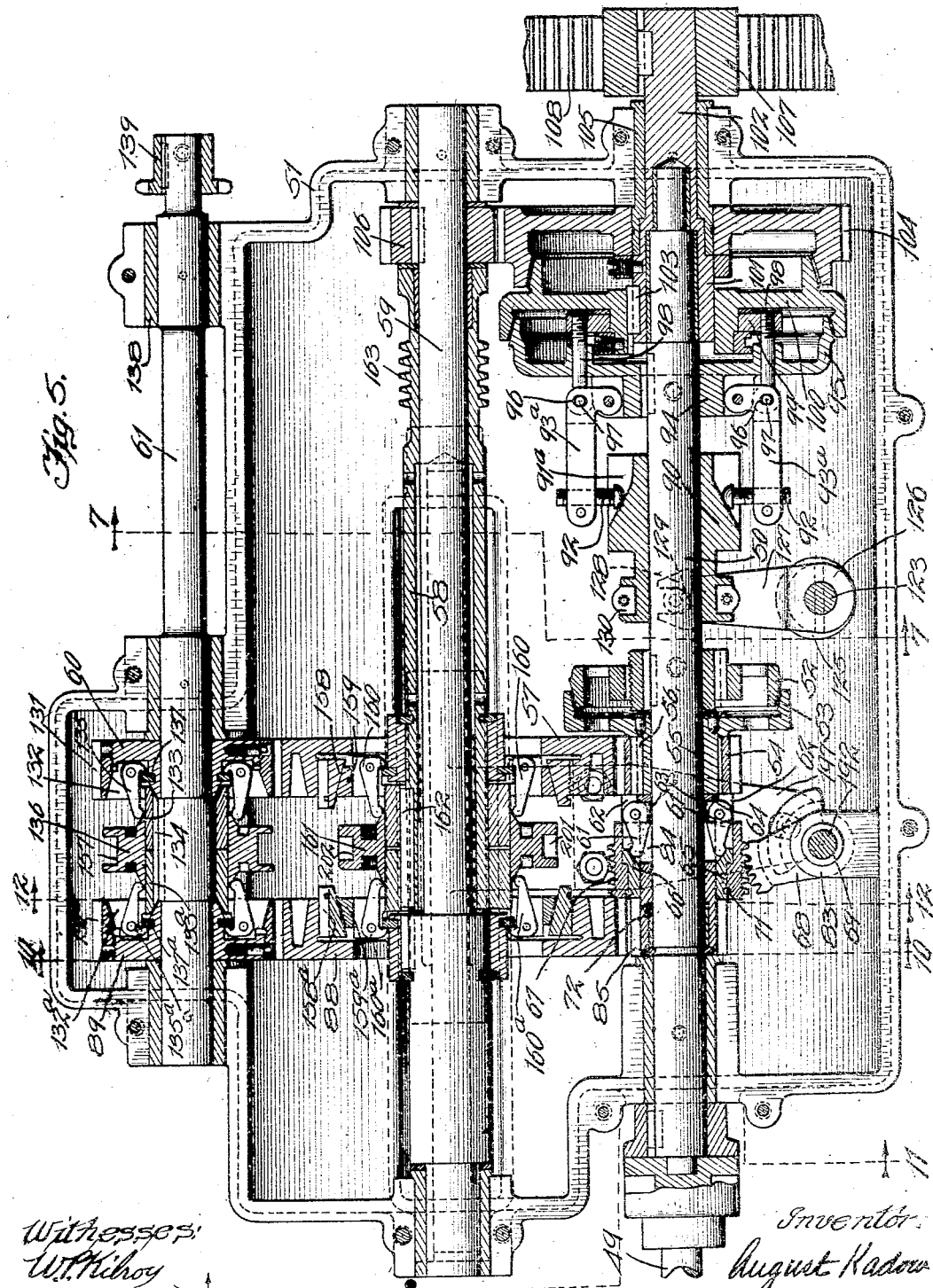

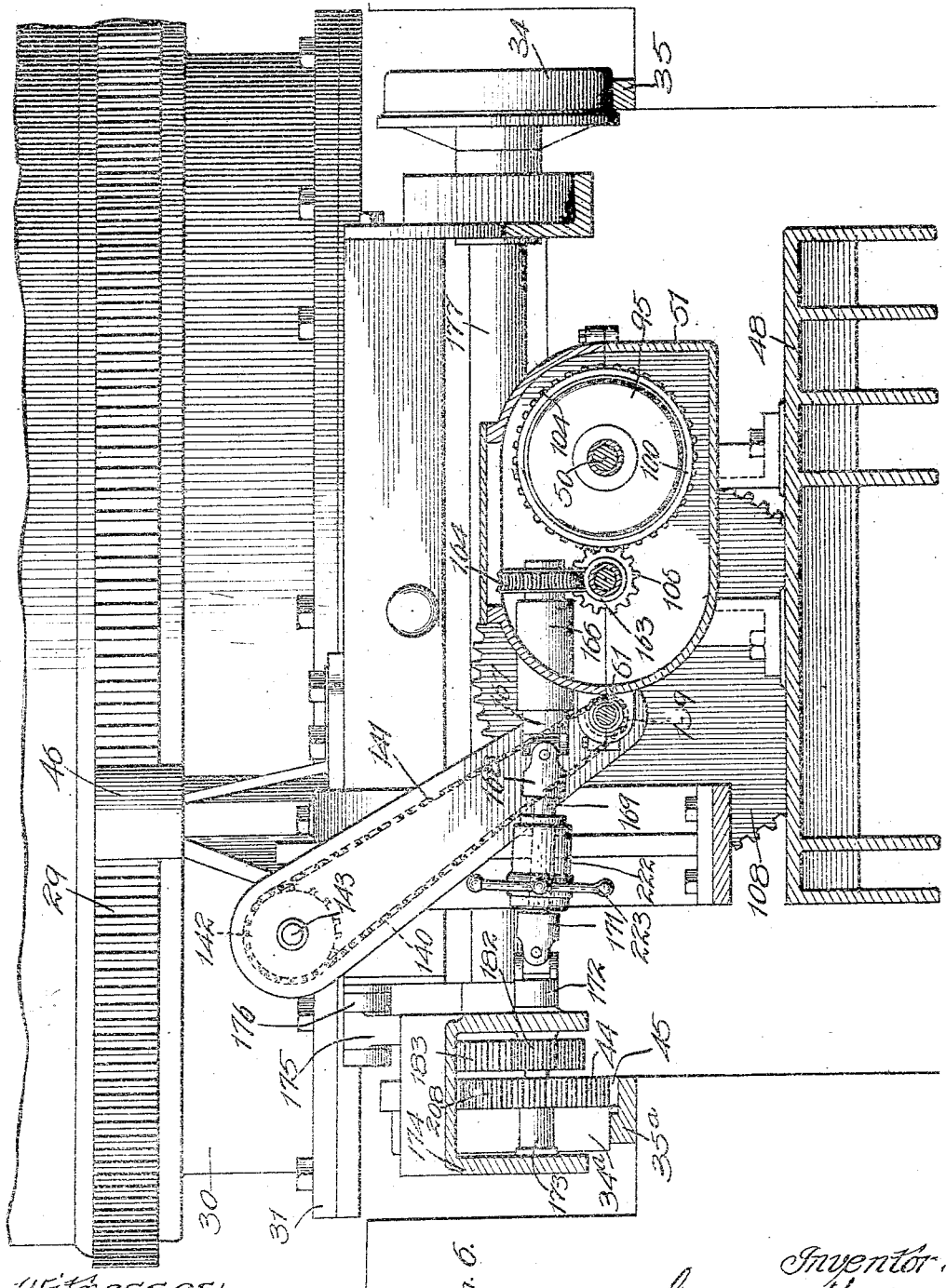

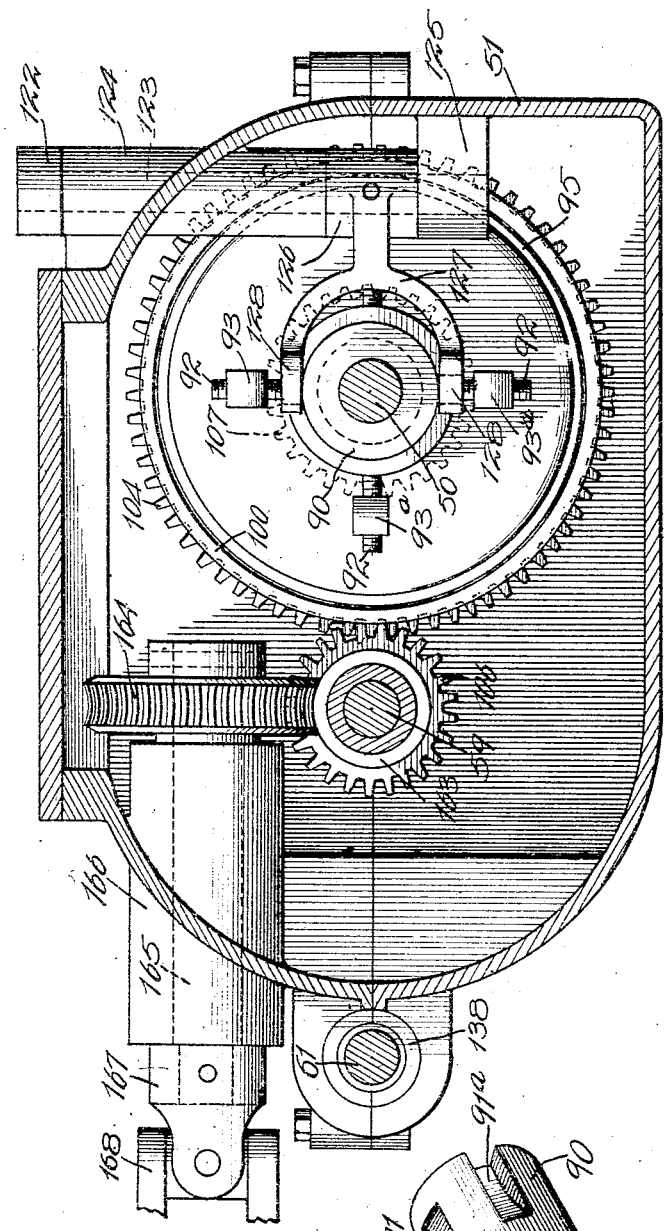

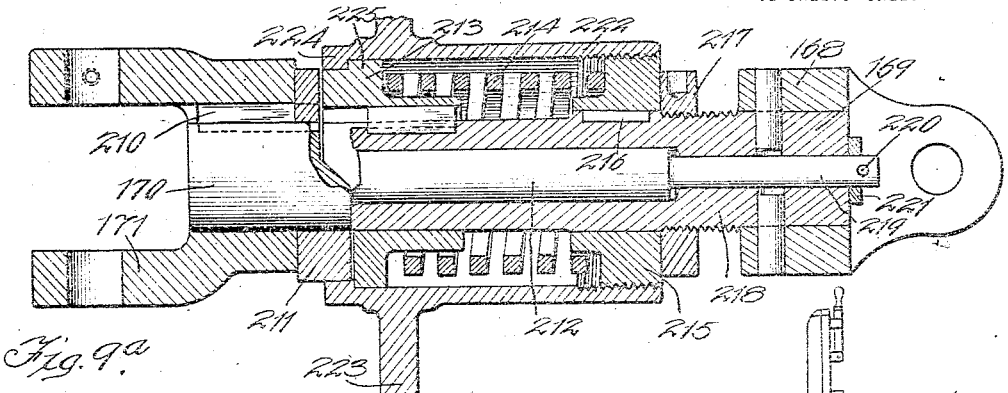
Fig. 9ᵃ
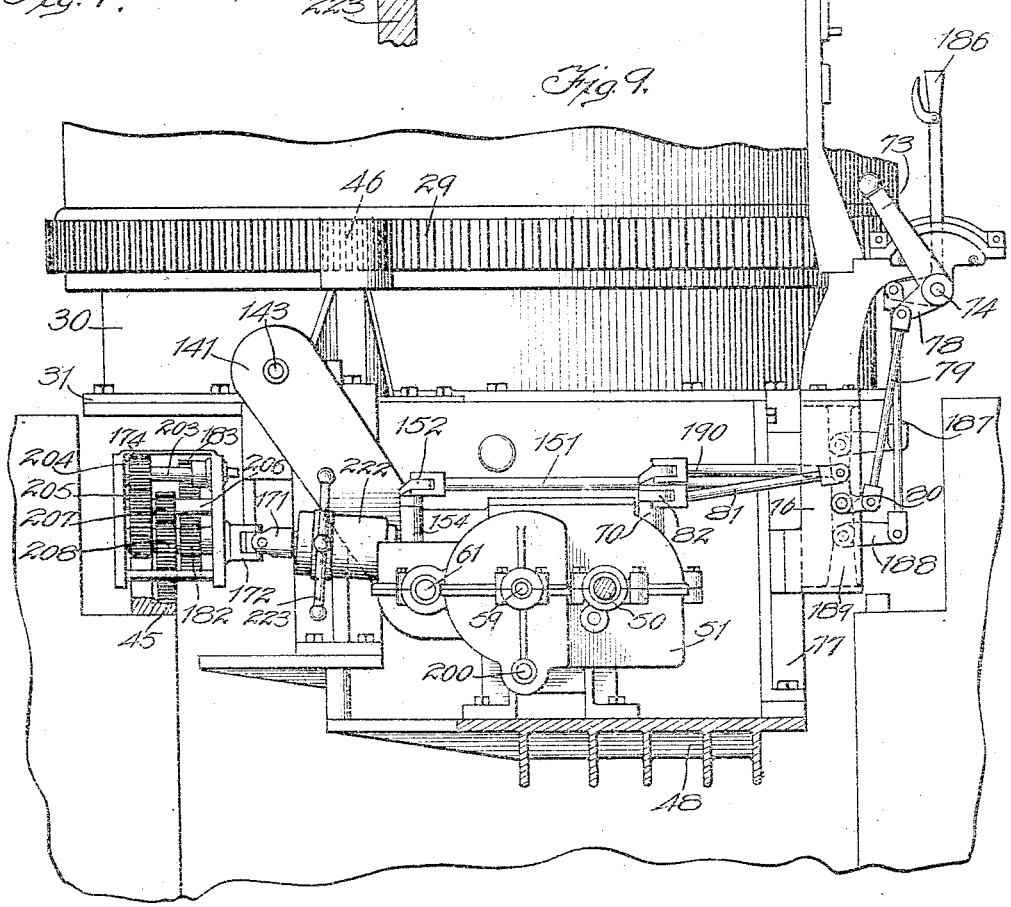
Fig. 9.

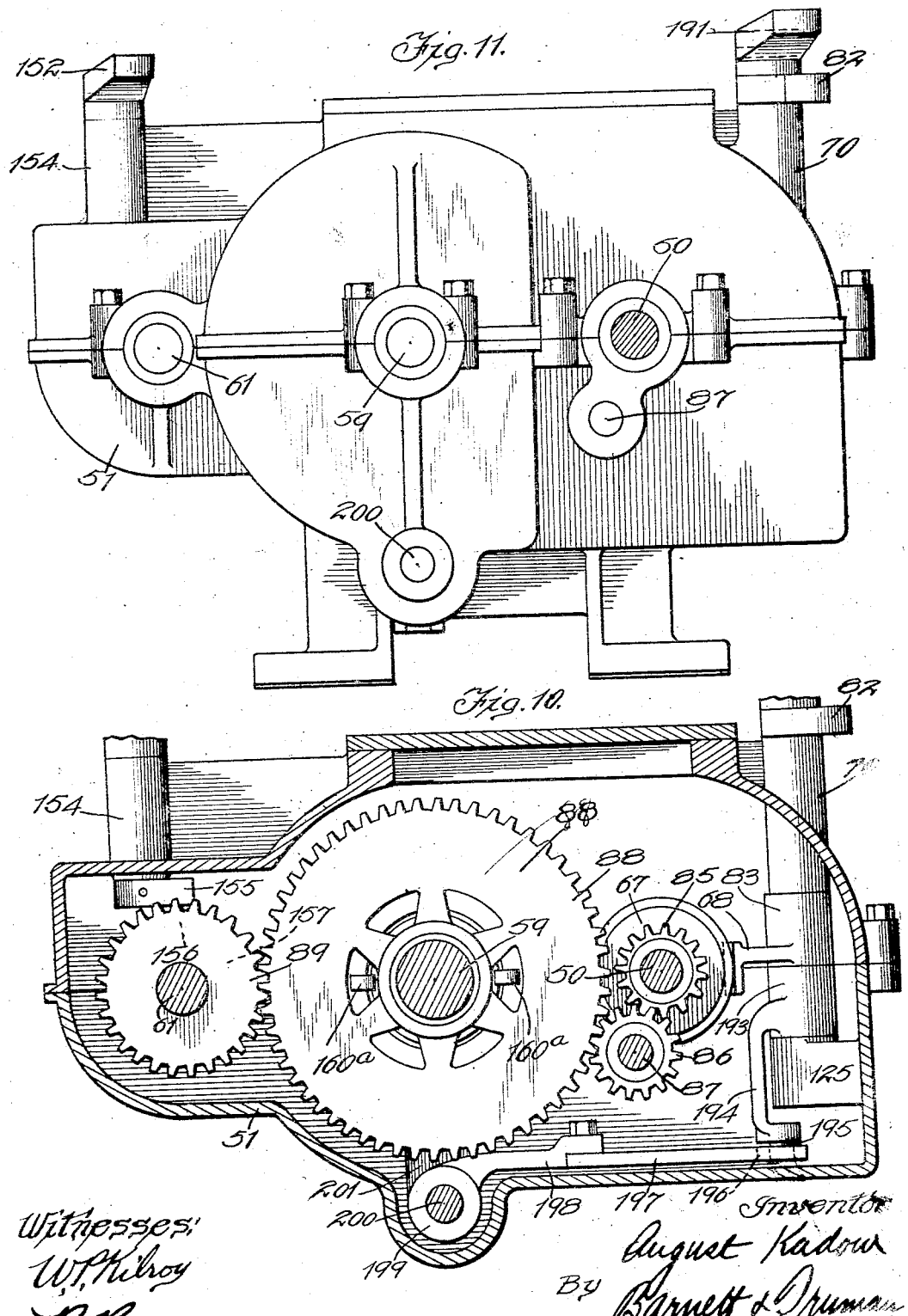

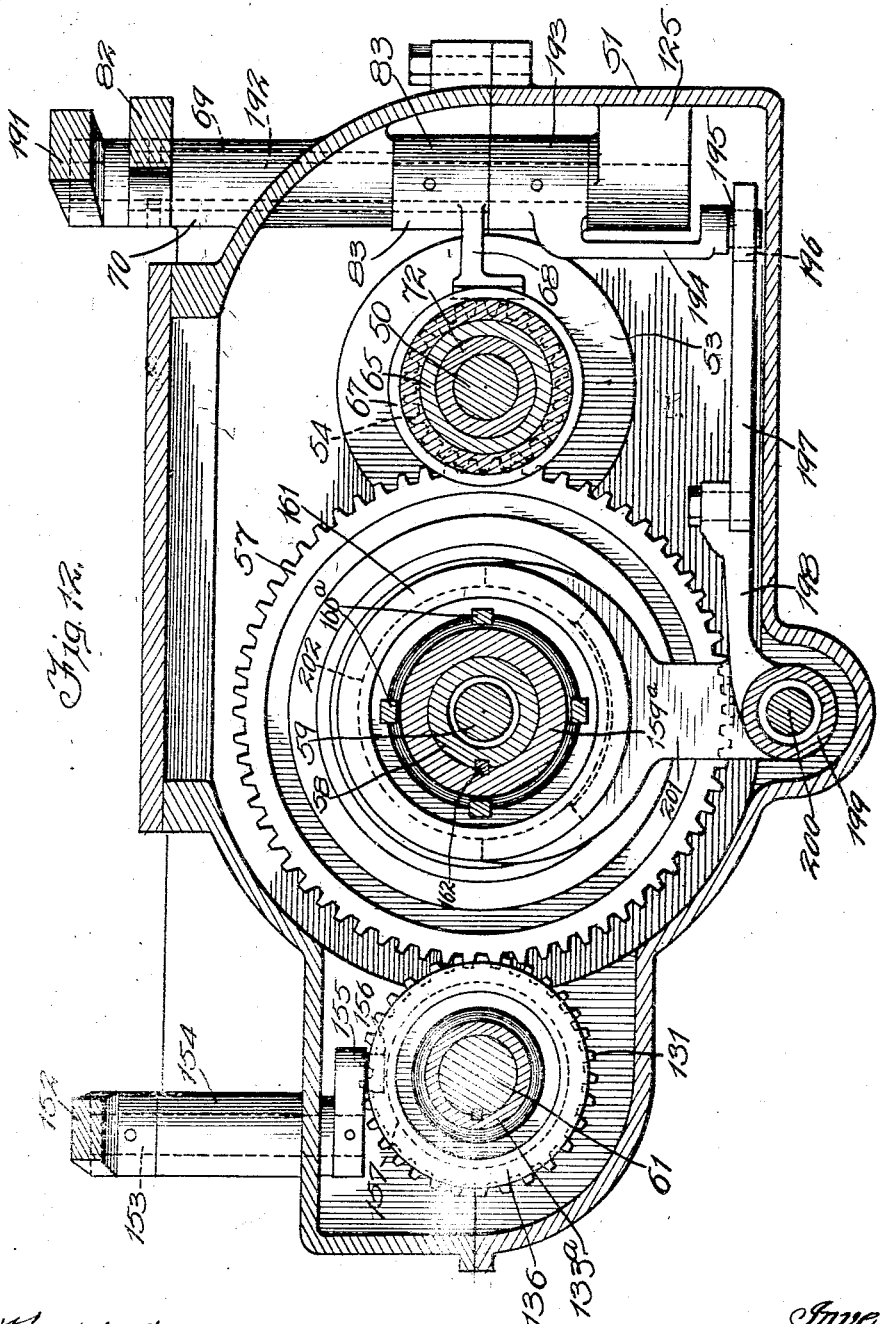

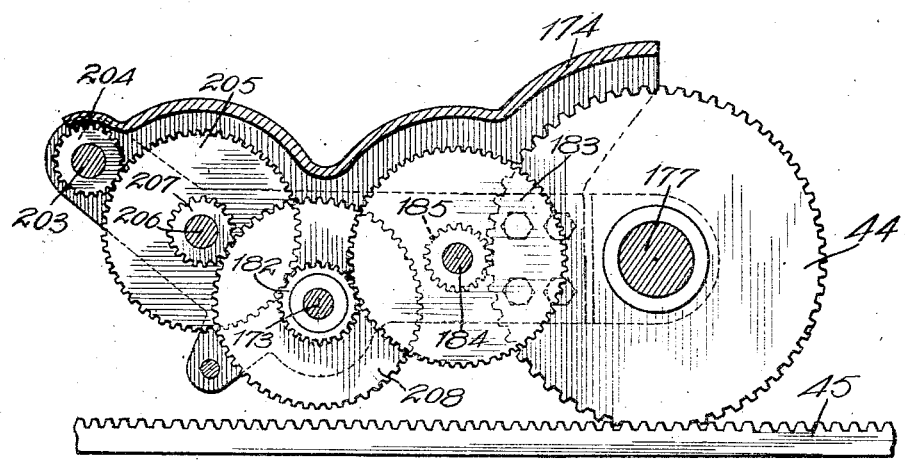
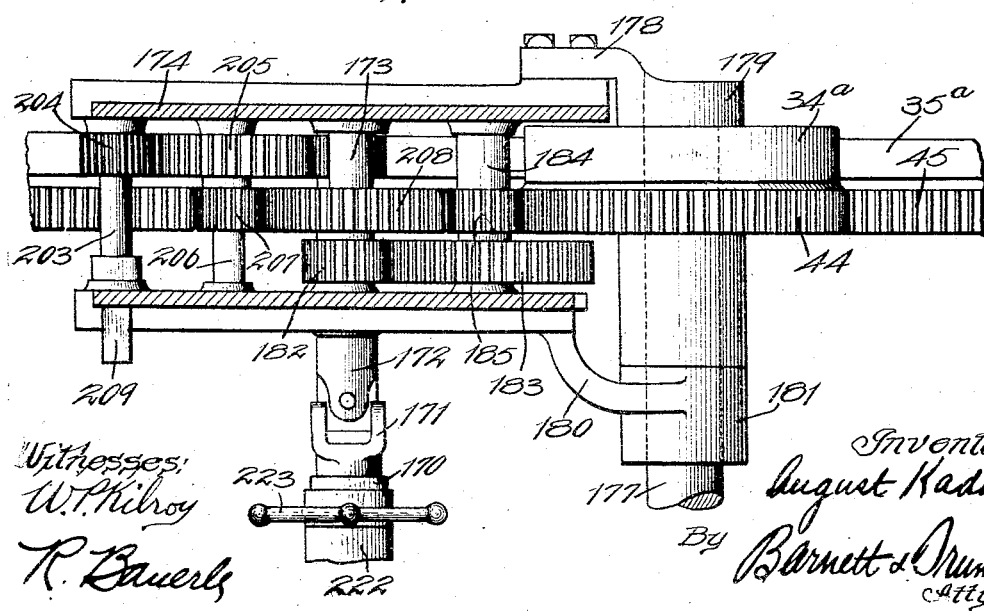

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

TRANSMISSION APPARATUS.

1,142,437.  Specification of Letters Patent.  Patented June 8, 1915.

Application filed October 17, 1912. Serial No. 726,250.

*To all whom it may concern:*

Be it known that I, AUGUST KADOW, a citizen of the United States, residing at Toledo, in the county of Lucas and State of Ohio, have invented certain new and useful Improvements in Transmission Apparatus, of which the following is a specification.

My invention relates to apparatus for transmitting power, and the object of the invention, broadly speaking, is to provide mechanism whereby forward or reverse movements may be imparted, as occasion may require, to three driven elements from a single prime mover.

The specific object of the invention is to provide a transmission mechanism suitable for use in connection with the glass forming machine shown and described in my copending application Serial No. 570,621, filed July 6, 1911.

In the machine in question the glass forming units are carried on a rotatable framework which is supported so that it may be moved to and from the glass furnace and also raised and lowered in accordance with variations in the level of the glass in the furnace.

My present invention provides a mechanism whereby a single motor may be employed for effecting all of these movements.

The invention consists in certain novel arrangements, constructions and devices for carrying out the above stated objects, and in the other improvements in power transmission apparatus shown in the drawings annexed hereto and which will be hereinafter described and claimed.

The invention is illustrated, in a preferred embodiment, in the accompanying drawings wherein—

Figure 1 is a side elevation of the transmission mechanism which I have devised shown in connection with the glass forming machine referred to above. Fig. 2 is a plan view of the motor and transmission mechanism with the cover of the casing containing the transmission mechanism removed. Fig. 3 is a sectional elevation of the motor and transmission mechanism taken on line 3—3 of Fig. 2. Fig. 4 is a sectional plan taken on line 4—4 of Fig. 3. Fig. 5 is a sectional plan on line 5—5 of Fig. 3. Fig. 6 is a sectional elevation on line 6—6 of Fig. 2. Fig. 7 is a sectional view on line 7—7 of Fig. 5. Fig. 8 is a view, in perspective, of a slidable collar forming a part of the mechanism for controlling the direction of rotation of the machine. Fig. 9 is a sectional elevation taken on line 9—9 of Figs. 1 and 3. Fig. 9[a] is a sectional view of the clutch, shown particularly in Figs. 6 and 9, for disconnecting the mechanism for moving the machine forward and back on the track from the transmission mechanism. Figs. 10, 11 and 12 are sectional views taken on lines 10—10, 11—11 and 12—12, respectively, of Fig. 5. Fig. 13 is a sectional view on line 13—13 of Fig. 2, Fig. 14 is a plan view, showing the housing in section, illustrating the train of gears shown in Fig. 13. Fig. 15 is a sectional view taken on line 15—15 of Fig. 1, illustrating part of the raising and lowering mechanism. Fig. 16 is a sectional plan view taken on line 16—16 of Fig. 15. Fig. 17 is a view illustrating part of the mechanism for rotating the machine, and Fig. 18 is a plan view of the mechanism shown in Fig. 17.

Like characters of reference designate like parts in the several figures of the drawings.

Referring to the drawings, and particularly to Fig. 1, 25 designates the glass furnace having a working opening 26.

The glass forming machine comprises a rotating framework 27 on which the glass blowing spindles 28 and the other operative devices of the machine are supported. This framework is provided with a circular rack or gear 29 and is mounted on a circular base 30 supported on a base plate 31. The base plate is supported on shafts 32 carried in bearings in levers 33. The levers fulcrum at one end upon the axles of wheels 34, 34[a] (Fig. 6) which run upon tracks 35, 35[a]. The inner ends of the levers bear upon brackets 36 on the threaded shafts 37, 37[a] which at their lower ends carry sheaves 38.

The weight of the machine is counterbalanced by means of weights 39 supported on cables 40 anchored to the base plate at 41 and extending around the sheaves 38 and similar sheaves 42 on the base plate. The threaded shafts 37, 37[a] (shown best in Fig. 15) are engaged with the base plate of the machine by means of nuts 43 which thread onto the shafts and are held from movement lengthwise of the shaft. The machine is raised and lowered by rotating these nuts. The mechanism for doing this will be described subsequently under the heading "Raising and lowering mechanism."

The movement of the machine to and from the furnace is accomplished by means of a cog wheel 44 (Figs. 3, 6 and 13) which engages with a rack rail 45. The mechanism for driving the cog wheel 44 will be hereinafter described under the heading "Mechanism for moving the machine to and from the furnace."

The rotation of the frame 27 is accomplished by means of a pinion 46 which meshes with the circular rack 29 and is driven by certain mechanisms which will be described under the heading "Mechanism for rotating the machine."

The motor which supplies power for these several movements is designated 47 and is carried on a bracket 48 secured to the base plate 31. The armature shaft 49 of the motor is connected with the main shaft 50 (Fig. 5) of a transmission mechanism which is contained within a casing 51 supported on the bracket 48. The shaft 50 is therefore driven at all times when the motor is in operation. The transmission mechanism is connected with the shaft 50, or disconnected therefrom, by means of what I have termed the main clutch.

*The main clutch.*—Keyed to the main shaft 50 is a clutch member 52 (Fig. 5) adapted to be engaged by a slidable clutch member 53 in which the shaft 50 revolves when out of engagement with the clutch member 52. 54 designates a pinion which is slidably mounted on the hub 55 of the clutch member 53 and is held from rotation thereon by the feather 56. The pinion 54 meshes with a pinion 57 revolubly mounted on a sleeve 58 surrounding a shaft 59 mounted in bearings in the casing 51. The gear 57 meshes with a gear 60 revolubly mounted on a shaft 61 which turns in bearings in said casing.

The clutch member 53 is moved into engagement with the clutch member 52, its hub sliding through the pinion 54, by the following mechanism: 61 designate dogs pivoted to projecting portions 62 of the pinion 54. The dogs are formed with the angular cams 63 adapted to bear against a hardened metal ring 64 which in turn bears against the hub 55 of the clutch member 53. The dogs are rocked so as to force the hub 55 through the pinion 54 by means of a collar 65 formed with a conical face 66. Surrounding the collar 65 is a sleeve 67 provided with circular teeth adapted to be meshed by the teeth of a sector gear 68 carried by a hollow shaft 69 mounted in a vertical bearing 70 (Figs. 10, 11 and 12) on the casing 51. Ball bearings 71 are provided between the collar 65 and the sleeve 67. The collar 65 surrounds a sleeve 72 on the shaft 50.

The sector gear 68 is rocked for the purpose of moving the collar 65 against and away from the dogs 61 by the following mechanism: 73 designates a lever—that may be termed the main clutch controlling lever—mounted on a shaft 74 (Figs. 3 and 9) supported by uprights 75 on a framework 76 which is carried by a diagonal bracing member 77 bolted to the bracket 48 and to the base plate 31 of the machine. Lever 73 has an arm 78 connected by link 79 with a bell crank 80 pivoted to the frame 76, the other arm of which is connected by a link 81 with an arm 82 rigidly secured to the hollow shaft 69 (Figs. 4, 9, 10, 11 and 12). The lower end of the hollow shaft 69 extends into the casing 51 and has fixed thereon a collar 83 on which the sector gear 68 is integrally formed. The lever 73 therefore controls the position of the movable clutch member 53. With the clutch member 53 out of contact with the clutch member 52 the entire transmission mechanism is disengaged from the motor shaft 49, 50.

*Reversing movements.*—When the clutch member 53 is in engagement with the clutch member 52 the shaft 59, which is termed the intermediate shaft, is driven in the same direction as the shaft 50. This is accomplished by the following arrangements: The sleeve 72 is formed with slots 84 into which the dogs 61 extend. As the dogs 61 are pivoted to the pinion 54 which is feathered to the hub of the clutch member 53 the revolution of the latter with the fixed clutch member 52 revolves the sleeve 72. This sleeve is formed with gear teeth 85 which mesh with a gear wheel 86 (Fig. 10) turning on a stud 87 and meshing with a gear 88 (see also Figs. 2 and 5) keyed to the intermediate shaft 59. The gear 88 meshes with a gear 89 loose on the shaft 61 which corresponds with the beforementioned gear 60 but is driven in the opposite direction.

*Mechanism for rotating the machine.*— Slidably mounted on the main shaft 50 is a collar 90 (Figs. 2, 5, 7 and 8) formed with two pairs of diametrically arranged tapered slots 91, 91ª respectively, into which project the heads of screws 92 carried by angular arms 93, 93ª pivoted to the hub 94 of a clutch member 95 which is fixed to the shaft 50. The arms 93, 93ª are formed with slots 96 into which extend studs 97 on the end of rods 98 which pass loosely through openings in the fixed clutch member 95 and are threaded into a ring 99 carried by a movable clutch member 100. The latter has a slight longitudinal movement on the hub 101 of a shaft 102 which projects out of the casing 51, the clutch member 100 being held from rotation on the hub 101 by a feather 103. The clutch member 100 has two clutch faces, one adapted to engage with the clutch face on the clutch member 95 and another adapted to engage with a clutch face formed on a gear wheel 104 which turns on a bushing 105 in which the shaft 101, 102 turns. The gear wheel 104 is meshed by a smaller gear 106 keyed to the intermediate shaft 59. When the collar 90 is moved in one direction the movable clutch member 100 is clutched to the clutch member fixed to the main shaft 50 and shaft 102 is given a forward revolution. When the collar 90 is moved in the other direction the movable clutch member is clutched to the gear wheel 104 which is constantly driven from the pinion 106 on the intermediate shaft 59 so that the shaft 102 is driven in the opposite direction to reverse the rotation of the machine.

The rotation of the machine from shaft 102 is effected by the following train of gears: Keyed to the shaft 102 is a gear wheel 107 which meshes with a gear wheel 108 (Figs. 1, 5, 17 and 18) carried on a shaft 109 provided at its other extremity with a bevel gear 110 meshing with a bevel gear 111 on a vertical shaft 112 which carries a pinion 113 meshing with a large gear 114 carried on the shaft 115 having at its upper end the pinion 46 which meshes with the circular rack 29 on the rotatable frame of the machine.

The collar 90 for shifting the movable clutch member 100 is moved back and forth on shaft 50 by the following mechanism: Mounted on the shaft 74 (Figs. 1, 3 and 9) is a lever 117—the controlling lever for the mechanism for rotating the machine—connected by a link 118 with a bell crank 119 (Figs. 3 and 4) pivoted in a fork 120 on the base of the frame 76 and connected by a link 121 with an arm 122 (see also Fig. 7) on a shaft 123 revoluble in a vertical bearing 124 formed on the casing 51 and in a bearing provided by a bracket 125 within the casing. On the shaft 123 between the bearings 124 and 125 is a collar 126 formed with a yoke 127, the forked extremities 128 of which (Fig. 5) extend around rollers 129 on a ring 130 revolubly mounted in a groove in the collar 90.

*Raising and lowering mechanism.*—The gear wheels 60, 89 are constantly revolved on the shaft 61 in opposite directions. These gear wheels are formed with the clutch faces 131, 131$^a$ adapted to be engaged by clutch members 132, 132$^a$ which latter are provided with sleeves 133, 133$^a$, the clutch members being slidably mounted on the shaft 61 but held from rotation by the feather 134. Pivoted to the clutch members 132, 132$^a$ are dogs 135, 135$^a$, the inner extremities of which are engaged by the conical cam surfaces of a slidable collar 136. The outer ends of the dogs bear against rings 137, 137$^a$ fixed to the gears 60 and 89 respectively. When the collar 136 is moved from its central position one way or the other it engages one or other set of dogs and by rocking the dogs forces the clutch member 132 or 132$^a$, as the case may be, into engagement with the clutch face 131 or 131$^a$.

The shaft 61 extends outside of the casing 51, its outer extremity being supported in a bearing 138 on the outside of the casing. At the end of the shaft is a sprocket wheel 139 (Figs. 2 and 5) over which runs a chain 140 within a housing 141 (see also Figs. 6 and 9) which drives sprocket 142 on a shaft 143. The latter carries a worm 144 (Figs. 1, 15 and 16) which meshes with teeth 145 on one of the nuts 43, the nut being in effect a worm wheel. As beforementioned, there are two nuts 43, one on the shaft 37 and the other on the shaft 37$^a$, which latter shaft is on the farther side of the machine looking from the point of view of Fig. 1 (see Fig. 15). The worm 144 on the shaft 143 meshes directly with the nut on shaft 37$^a$. The nut on shaft 37 is simultaneously turned by a train actuated from shaft 143. This arrangement is not shown in the drawings herein as it is the same as that shown in my copending application above referred to.

The collar 136 is moved back and forth on the shaft 61 so as to raise or lower the machine by the following mechanism: Mounted on shaft 74 is a lever 146, the controlling lever for the raising and lowering mechanism, connected by a link 147 with a bell crank 148 (Figs. 3 and 4) pivotally mounted in a fork 149 depending from the upper web 150 of the frame 76. The other arm of the bell crank is connected by a link 151 with an arm 152 on a shaft 153 turning in a vertical bearing 154 (Figs. 10, 11 and 12) on the casing 51. Fixed to the lower end of the shaft 153 is an arm 155 carrying a roller 156 which enters the circumferential groove 157 (see also Fig. 5) in the collar 136.

*Mechanism for moving the machine to and from the furnace.*—The gears 57 and 88 are constantly driven but in opposite directions. These gears are formed with the clutch faces 158, 158$^a$ which are adapted to be engaged by clutch members 159, 159$^a$ provided with dogs 160, 160$^a$ operated by a collar 161 to cause the clutch members to be moved back and forth into and out of engagement with the clutch faces 158, 158$^a$, as the case may be, the construction being the same as that for clutching the gear wheels 60, 89 to the shaft 61 which has already been described. The clutch members 159, 159$^a$ slide on the sleeve 58 being held from rotation by the feather 162. By this means the sleeve is clutched either to the gear wheel 57 which constantly revolves in one direction or to the oppositely revolving gear wheel 88.

The machine is propelled back and forth on the tracks 35, 35ᵃ by means of the following mechanism: the sleeve 58 is formed with worm teeth 163 (Figs. 2, 5, 6 and 7) which mesh with a worm wheel 164 on a shaft 165 turning in a bearing 166 formed on the wall of the casing 51. To the other end of shaft 165 is secured the knuckle 167 of a universal joint, the other knuckle 168 of which is secured to the end of a hollow shaft 169 coupled, by means of the clutch shown in detail in Fig. 9ᵃ, to a shaft 170 which latter is connected by the universal joint 171, 172 to a shaft 173 (see also Figs. 13 and 14) which extends through a housing 174. The housing is formed with an arm 175 which is pivotally mounted in a bracket 176 on the base plate 31 of the machine, and is supported on the axle 177 of the supporting wheel 34ᵃ by means of an arm 178 on the hub 179 of the wheel and by an arm 180 on the housing provided with a sleeve 181 surrounding the axle 177.

On the shaft 173 is a gear wheel 182 which meshes with a gear 183 on a shaft 184 carrying a gear 185 meshing with a gear 44 which is rigid with the traction wheel 34ᵃ and meshes with the rack rail 45. The flexible connection between the shaft 165 and the shaft 173 and the flexible mounting of the housing 174 are to accommodate for the raising and lowering of the machine with respect to the track.

The mechanism for moving the collar 161 back and forth to drive the machine to and from the furnace is made up of the following parts: 186 is a lever mounted on the shaft 74 and connected by a link 187 with a bell crank 188 (Figs. 3, 4 and 9) mounted in a fork 189 on the base of the frame 76 and connected by a link 190 with an arm 191 on a shaft 192 (see also Figs. 10, 11 and 12) which extends into the hollow shaft 69 constituting part of the mechanism for shifting the main clutch. On the end of shaft 192 is a collar 193 having a depending arm 194 carrying a stud 195 which extends into a slot 196 in an arm 197 bolted to an arm 198 on a sleeve 199 slidable on a shaft 200 within the casing 51. The sleeve 199 carries a yoke 201, the ends of which extend into a circumferential groove 202 (see also Fig. 5) in the collar 161.

*Manual drive of machine on track and throw out clutch.*—In case of emergencies a train of gears is provided by means of which the machine may be backed away from the furnace by hand and a clutch is provided between shafts 165 and 173 whereby the driving gear 44 may be freed from the transmission in such cases.

The hand operated train for moving the machine on the track is shown particularly in Figs. 13 and 14 and is as follows: Mounted in the housing 174 is a shaft 203 carrying a gear 204 meshing with a larger gear 205 on a shaft 206 which carries the smaller gear 207 meshing with the large gear 208 on the shaft 173. The revolution of this shaft drives the machine in the manner above described. The shaft 203 is formed with the squared end 209 to which a crank may be applied. The hand operated train of gears runs idle when the machine is moved by the motor. The clutch whereby the driving train may be connected with or freed from the transmission is shown in Figs. 6 and 9 and its construction detailed in Fig. 9ᵃ. The knuckle 172 is secured to shaft 170 by a key 210 which also holds in place on the shaft 170 a clutch member 211. The shaft 170 is formed with the portion 212 which is reduced in diameter and surrounded by the hollow shaft 169. On the end of the shaft 169 is keyed a clutch member 213 which is normally pressed into engagement with the clutch member 211 by a heavy spring 214 which abuts against a collar 215 surrounding the shaft 169 and kept from rotation thereon by the key 216 and abutted against the adjusting nut 217 on the threaded portion 218 of the shaft 169. The extreme end of shaft 170 is further reduced in diameter to form a stem 219 which projects out from the end of shaft 169 and is provided with the cross pin 220 lying against the washer 221. The collar 215 is threaded to receive the threaded end of a sleeve 222 provided with a hand wheel 223. The sleeve 222 has an angular projection 224 which abuts against a similar projection 225 on the clutch member 213. By screwing the sleeve 222 back on the collar 215 against the pressure of spring 214 the clutch members 211, 213 are disengaged so that the shaft 170 and the train of gears connected therewith will be disengaged from the transmission mechanisms contained in casing 51.

I claim:

1. The combination with a track, of a truck thereon, a base member which is supported on the truck so as to be capable of vertical movement, a rotatable element on the base, driving trains for propelling the truck on the track, rotating said rotatable element and raising and lowering said base, respectively, a motor, a transmission mechanism interposed between said motor and said driving trains comprising means for driving each of said trains forwardly or backwardly independently of the others and work performing apparatus carried by said rotatable element and adapted to be affected in its action by said driving trains.

2. The combination with a track, of a truck thereon, a rack rail adjacent said track, a base member supported on the truck so as to be capable of vertical movement, a rotatable element on the base, a driving train engaging said rack rail for propelling the truck on the track, driving trains for rotating said rotatable element and raising and lowering said base respectively, a motor supported on said base, transmission mechanism interposed between said motor and said three driving trains comprising means for driving each of the same forwardly or backwardly independently of the others and work-performing apparatus carried by said rotatable element and adapted to be affected in its action by said driving trains.

3. In power transmission mechanism, the combination with a driving shaft, of a clutch member fixed thereto, a clutch member slidable thereon, a gear wheel having a feathered connection with said last named clutch member, and means for moving said last named clutch member into and out of engagement with the other clutch member.

4. In power transmission mechanism, the combination with a driving shaft, of a clutch member fixed thereto, a clutch member slidable thereon and provided with a hub, a gear wheel feathered to the hub, and means for moving said last named clutch member through the gear wheel into engagement with the fixed clutch member.

5. In power transmission mechanism, the combination with a driving shaft, of a clutch member fixed thereto, a clutch member slidable thereon, a gear wheel having a feathered connection with said last named clutch member, a second gear wheel running on said shaft, and means for moving the sliding clutch member into engagement with the fixed clutch member and for coupling said second mentioned gear wheel to said movable clutch member so that these two elements revolve together.

6. In power transmission mechanism, the combination with a driving shaft, of a clutch member fixed thereto, a clutch member slidable thereon, a gear wheel having a feathered connection with said last named clutch member, a second gear wheel formed with a hub having longitudinal slots, dogs in said slots adapted to couple said gear wheels so that they revolve together, and a sleeve slidable on said hub which engages said dogs and forces the movable clutch member into engagement with the fixed clutch member.

7. In power transmission mechanism, the combination with a driving shaft, of a clutch member fixed thereto, a clutch member slidable thereon, a gear wheel having a feathered connection with said last named clutch member, a second gear wheel formed with a hub having longitudinal slots, dogs in said slots adapted to couple said gear wheels so that they revolve together, a sleeve slidable on said hub which engages said dogs and forces the movable clutch member into engagement with the fixed clutch member, said sleeve being formed with circular teeth, and a sector gear which engages said teeth and is rocked to move the sleeve back and forth.

8. In power transmission mechanism, the combination with a driving shaft, of a clutch member fixed thereto, a clutch member slidable thereon and provided with a hub, a gear wheel feathered to said hub, a second gear wheel loose on said shaft provided with a hub having longitudinal slots, of pivoted dogs which fit into said slots so as to couple said gear wheels together, a sleeve provided with teeth surrounding the hub of the second named gear wheel adapted to rock said dogs so as to force the movable clutch member through the gear wheel on its hub into contact with the fixed clutch member, and a sector gear engaging the teeth of said sleeve which is rocked so as to give the sleeve longitudinal movement with respect to the shaft.

9. In power transmission mechanism, the combination with a driving shaft, of a driven shaft having a hub surrounding one end of the driving shaft, a clutch member slidable longitudinally on said hub, a clutch member fixed to the driving shaft, a gear wheel normally free running on the other side of said movable clutch member from the fixed clutch member having a clutch face, an intermediate shaft driven in the same direction as said first named shaft, and a gear wheel fixed on said intermediate shaft which meshes with the first named gear.

10. In power transmission mechanism, the combination with a driving shaft, of a driven shaft having a hub surrounding one end of the driving shaft, a clutch member slidable longitudinally on said hub, a clutch member fixed to the driving shaft, a gear wheel normally free running on the other side of said movable clutch member from the fixed clutch member having a clutch face, an intermediate shaft driven in the same direction as said first named shaft, a gear wheel fixed on said intermediate shaft which meshes with the first named gear, a collar slidable on said driving shaft, and mechanism operated by the movement of said collar for giving movement longitudinally of the shaft to said movable clutch member.

11. In power transmission mechanism, the combination with a driving shaft, of a driven shaft having a hub surrounding one end of the driving shaft, a clutch member slidable longitudinally on said hub, a clutch member fixed to the driving shaft, a gear wheel normally free running on the other side of said movable clutch member having a clutch face, an intermediate shaft driven in the same direction as said first named shaft, a gear wheel fixed on said intermediate shaft which meshes with the first named gear, a collar slidable on said driving shaft, mechanism operated by the movement of said collar for giving movement longitudinally of the shaft to said movable clutch member, comprising rocking elements and rods engaged by said rocking elements and extending through the clutch member fixed to the driving shaft and connected with said movable clutch member.

12. In power transmission mechanism, the combination with a driving shaft, of a driven shaft having a hub surrounding one end of the driving shaft, a clutch member slidable longitudinally on said hub, a clutch member fixed to the driving shaft, a gear wheel normally free running on the other side of said movable clutch member from the fixed clutch member having a clutch face, an intermediate shaft driven from the first named shaft and revolving in the same direction as said first named shaft, and a gear wheel fixed on said intermediate shaft which meshes with the first named gear.

13. In power transmission mechanism, the combination with a driving shaft, of a driven shaft having a hub surrounding one end of the driving shaft, a clutch member slidable longitudinally on said hub, a clutch member fixed to the driving shaft, a gear wheel provided with a clutch face loose running on the other side of the movable clutch member from the fixed clutch member, an intermediate shaft having a gear wheel fixed thereto meshing with the first named gear wheel, a train of gears driven by said driving shaft which revolves the intermediate shaft in the same direction as the driving shaft, means for moving said movable clutch member either into contact with the clutch member on the driving shaft or the clutch face on said first named gear, and a clutch adapted to connect the train of gears for driving the intermediate shaft with said driving shaft or to disconnect the same therefrom.

14. In power transmission mechanism, the combination with a driving shaft, of a shaft driven from the driving shaft in the same direction, a sleeve on said second named shaft, and mechanism for revolving the sleeve in either direction as desired comprising a clutch member fixed to the second named shaft, a gear wheel loose running on said sleeve having a clutch face, clutch members feathered to said sleeve between said clutch member and gear wheel, and a gear wheel revoluble with the first named shaft which meshes with said first named gear.

15. In power transmission apparatus, the combination with a driving shaft, of a pair of gear wheels adapted to revolve therewith, a second shaft, a sleeve on said shaft, a pair of gear wheels, one of which is fixed to said second named shaft and the other of which is loose running on said sleeve, one of said last named gear wheels meshing directly with one of the gears on the driving shaft, a gear wheel meshing with two of the previously specified gears so that the gears on the second named shaft revolve in opposite directions, and means for clutching one or the other of the gears on said second named shaft to the sleeve surrounding said shaft.

16. In power transmission apparatus, the combination with a driving shaft, of a pair of gear wheels adapted to revolve therewith, a second shaft, a sleeve on said shaft, a pair of gear wheels, one of which is fixed to said second named shaft and the other of which is loose running on said sleeve, one of said last named gear wheels meshing directly with one of the gears on the driving shaft, a gear wheel meshing with two of the previously specified gears so that the gears on the second named shaft revolve in opposite directions, means for clutching one or the other of the gears on said second named shaft to the sleeve surrounding said shaft, and means for connecting the gear wheels on the driving shaft to said shaft or disconnecting them therefrom.

17. In power transmission apparatus, the combination with a driving shaft, of a pair of gear wheels adapted to revolve therewith, a second shaft, a sleeve on said shaft, a pair of gear wheels, one of which is fixed to said second named shaft and the other of which is loose running on said sleeve, one of said last named gear wheels meshing directly with one of the gears on the driving shaft, a gear wheel meshing with two of the previously specified gears so that the gears on the second named shaft revolve in opposite directions, clutch members feathered to said sleeve, and a slidable collar adapted to cause said clutch members to engage the gear wheels on the second named shaft, respectively.

18. In power transmission apparatus, the combination with a driving shaft, of a driven shaft, an intermediate shaft, a pair of gears on the intermediate shaft, a pair of gears loose running on the driven shaft meshing with said last named gears, respectively, gear wheels revolved by the driving shaft for revolving the gears on the intermediate shaft in opposite directions, and means for coupling the driven shaft to one or other of the gears thereon.

19. In power transmission apparatus, the combination with a driving shaft, of a driven shaft, an intermediate shaft, a pair of gears on the intermediate shaft, a pair of gears loose running on the driven shaft meshing with said last named gears, respectively, gear wheels revolved by the driving shaft for revolving the gears on the intermediate shaft in opposite directions, means for coupling the driven shaft to one or other of the gears thereon, a sleeve on the intermediate shaft, and means for coupling said sleeve to one or other of the gear wheels on said intermediate shaft.

20. In power transmission apparatus, the combination with a driving shaft, of a driven shaft, an intermediate shaft, a pair of gears on the intermediate shaft, a pair of gears loose running on the driven shaft meshing with said last named gears, respectively, gear wheels revolved by the driving shaft for revolving the gears on the intermediate shaft in opposite directions, means for coupling the driven shaft to one or other of the gears thereon, a sleeve on the intermediate shaft, means for coupling said sleeve to one or other of the gear wheels on said intermediate shaft, and means for connecting the gears which drive the gears on the intermediate shaft with the driving shaft or for disconnecting the same therefrom.

21. In power transmission apparatus, the combination with a driving shaft, of a driven shaft and an intermediate shaft, a pair of gears adapted to revolve with said driving shaft, a pair of gears on the intermediate shaft, one of which is fixed to said shaft and the other loose running thereon, one of which meshes directly with one of the gears on the driving shaft, a gear interposed between the other gear on the driving shaft and the other gear on the intermediate shaft, a pair of gears loose running on the driven shaft and meshing with the gears on the intermediate shaft, respectively, and means for coupling the driven shaft to either of said gear wheels thereon as desired.

22. In power transmission apparatus, the combination with a driving shaft, of a driven shaft and an intermediate shaft, a pair of gears adapted to revolve with said driving shaft, a pair of gears on the intermediate shaft, one of which is fixed to said shaft and the other loose running thereon, one of which meshes directly with one of the gears on the driving shaft, a gear interposed between the other gear on the driving shaft and the other gear on the intermediate shaft, a pair of gears loose running on the driven shaft and meshing with the gears on the intermediate shaft, respectively, means for coupling the driven shaft to either of said gear wheels thereon as desired, a sleeve on the intermediate shaft, and means for coupling either of said gear wheels on the intermediate shaft to said sleeve, as desired.

23. In power transmission apparatus, the combination with a driving shaft, of a driven shaft and an intermediate shaft, a pair of gears adapted to revolve with said driving shaft, a pair of gears on the intermediate shaft, one of which is fixed to said shaft and the other loose running thereon, one of which meshes directly with one of the gears on the driving shaft, a gear interposed between the other gear on the driving shaft and the other gear on the intermediate shaft, a pair of gears loose running on the driven shaft and meshing with the gears on the intermediate shaft, respectively, means for coupling the driven shaft to either of said gear wheels thereon as desired, a sleeve on the intermediate shaft, means for coupling either of said gear wheels on the intermediate shaft to said sleeve as desired, and means for connecting the gear wheels on the driving shaft to said driving shaft, or disconnecting them therefrom.

24. In power transmission apparatus, the combination with a driving shaft, of a driven shaft and an intermediate shaft, a pair of gears adapted to revolve with said driving shaft, a pair of gears on the intermediate shaft, one of which is fixed to said shaft and the other loose running thereon, one of which meshes directly with one of the gears on the driving shaft, a gear interposed between the other gear on the driving shaft and the other gear on the intermediate shaft, a pair of gears loose running on the driven shaft and meshing with the gears on the intermediate shaft, respectively, means for coupling the driven shaft to either of said gear wheels thereon as desired, a sleeve surrounding the driving shaft, a clutch member feathered to said sleeve, a clutch member fixed to the driving shaft, a loose running gear wheel provided with a clutch face adapted to be engaged by said movable clutch member, and a gear wheel on the intermediate shaft adapted to mesh with said last named gear wheel.

25. In power transmission apparatus, the combination with a driving shaft, of a driven shaft and an intermediate shaft, a pair of gears adapted to revolve with said driving shaft, a pair of gears on the intermediate shaft, one of which is fixed to said shaft and the other loose running thereon, one of which meshes directly with one of the gears on the driving shaft, a gear interposed between the other gear on the driving shaft and the other gear on the intermediate shaft, a pair of gears loose running on the driven shaft and meshing with the gears on the intermediate shaft, respectively, means for coupling the driven shaft to either of said gear wheels thereon as desired, a sleeve on the intermediate shaft, means for coupling either of said gears on the intermediate shaft to said sleeve as desired, a sleeve surrounding the driving shaft, a clutch member feathered to said sleeve, a clutch member fixed to the driving shaft, a loose running gear wheel provided with a clutch face adapted to be engaged by said movable clutch member, and a gear on the intermediate shaft adapted to mesh with said last named gear.

26. In power transmission apparatus, the combination with a driving shaft, of a driven shaft and an intermediate shaft, a pair of gears adapted to revolve with said driving shaft, a pair of gears on the intermediate shaft, one of which is fixed to said shaft and the other loose running thereon, one of which meshes directly with one of the gears on the driving shaft, a gear interposed between the other gear on the driving shaft and the other gear on the intermediate shaft, a pair of gears loose running on the driven shaft and meshing with the gears on the intermediate shaft, respectively, means for coupling the driven shaft to either of said gear wheels thereon as desired, a sleeve on the intermediate shaft, means for coupling either of said gears on the intermediate shaft to said sleeve as desired, a sleeve surrounding the driving shaft, a clutch member feathered to said sleeve, a clutch member fixed to the driving shaft, a loose running gear wheel provided with a clutch face adapted to be engaged by said movable clutch member, a gear on the intermediate shaft adapted to mesh with said last named gear, and means for connecting the gears on the driving shaft therewith or for disconnecting the same therefrom as desired.

27. In apparatus of the character described, the combination with a track, of a base movably supported on said track, a revoluble element on said base, mechanism for raising and lowering the base with respect to said track, a bracket supported from said base, a motor on the bracket to actuate said raising and lowering mechanism and work-performing apparatus carried by said revoluble element and adapted to be affected in its action by the revolution of that element and by the raising and lowering mechanism.

28. In apparatus of the character described, the combination with a track, of a base movably supported on said track, a revoluble element on said base, mechanism for raising and lowering the base with respect to said track, mechanism for moving said base forward and back on the track, mechanism for revolving said rotating element, a bracket carried by said base, a motor on said bracket, a transmission mechanism interposed between the motor and the first mentioned three mechanisms whereby said mechanisms may be operated separately or concurrently as desired and work-performing apparatus carried by the revoluble element and adapted to be affected in its action by the first-mentioned three mechanisms.

AUGUST KADOW.

Witnesses:
G. M. RESWICK,
W. L. VAN NESS.